Figure 1:
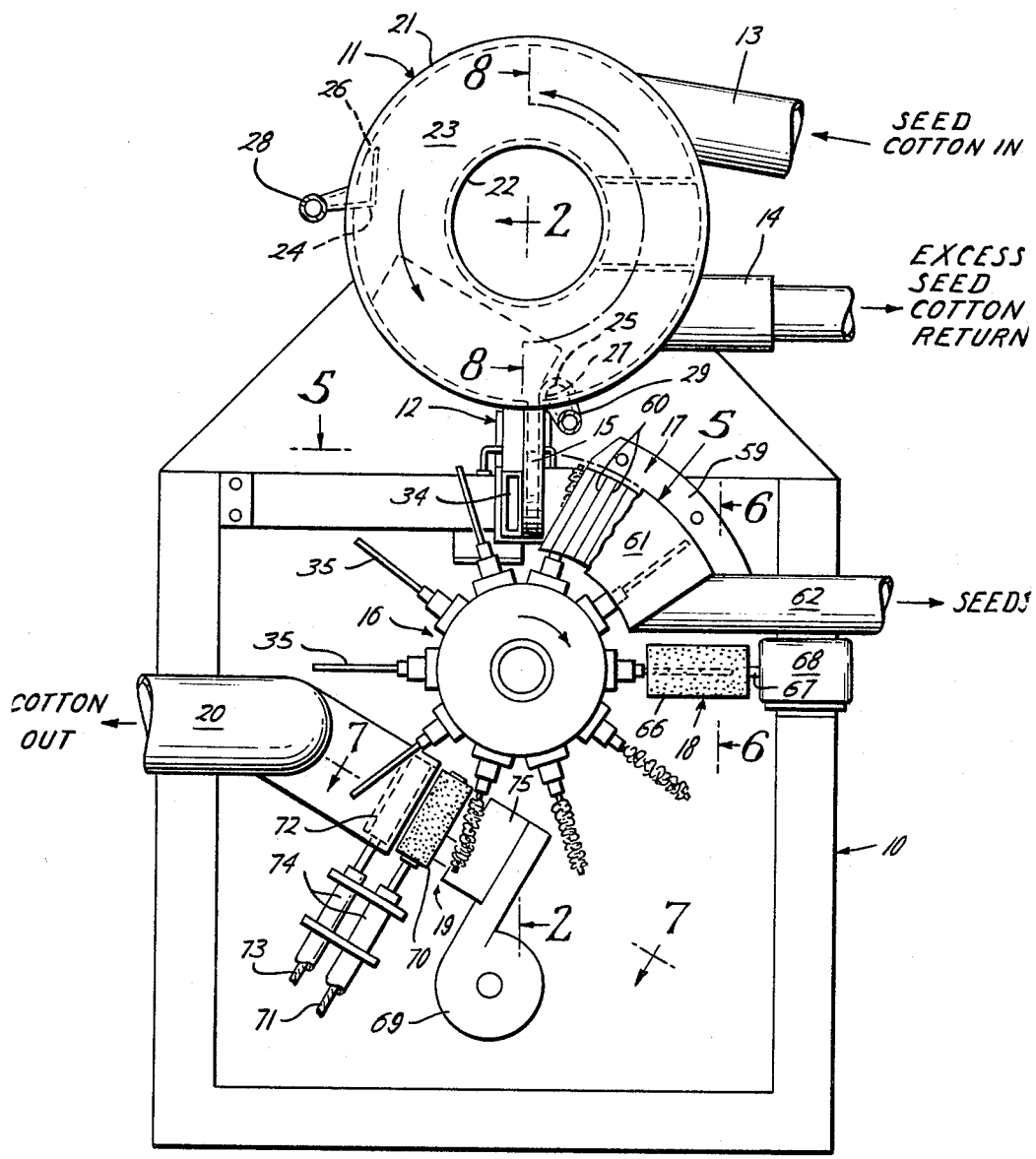

Nov. 15, 1966    L. E. STEIMEN ET AL    3,284,855
SEED COTTON CLEANING AND GINNING

Filed Jan. 9, 1963    5 Sheets-Sheet 1

Lawrence E. Steimen
Bertram A. Fulton
INVENTORS

BY
ATTORNEYS

Nov. 15, 1966

L. E. STEIMEN ET AL 3,284,855

SEED COTTON CLEANING AND GINNING

Filed Jan. 9, 1963

5 Sheets-Sheet 3

Lawrence E. Steimen
Bertram A. Fulton
INVENTORS

BY

ATTORNEYS

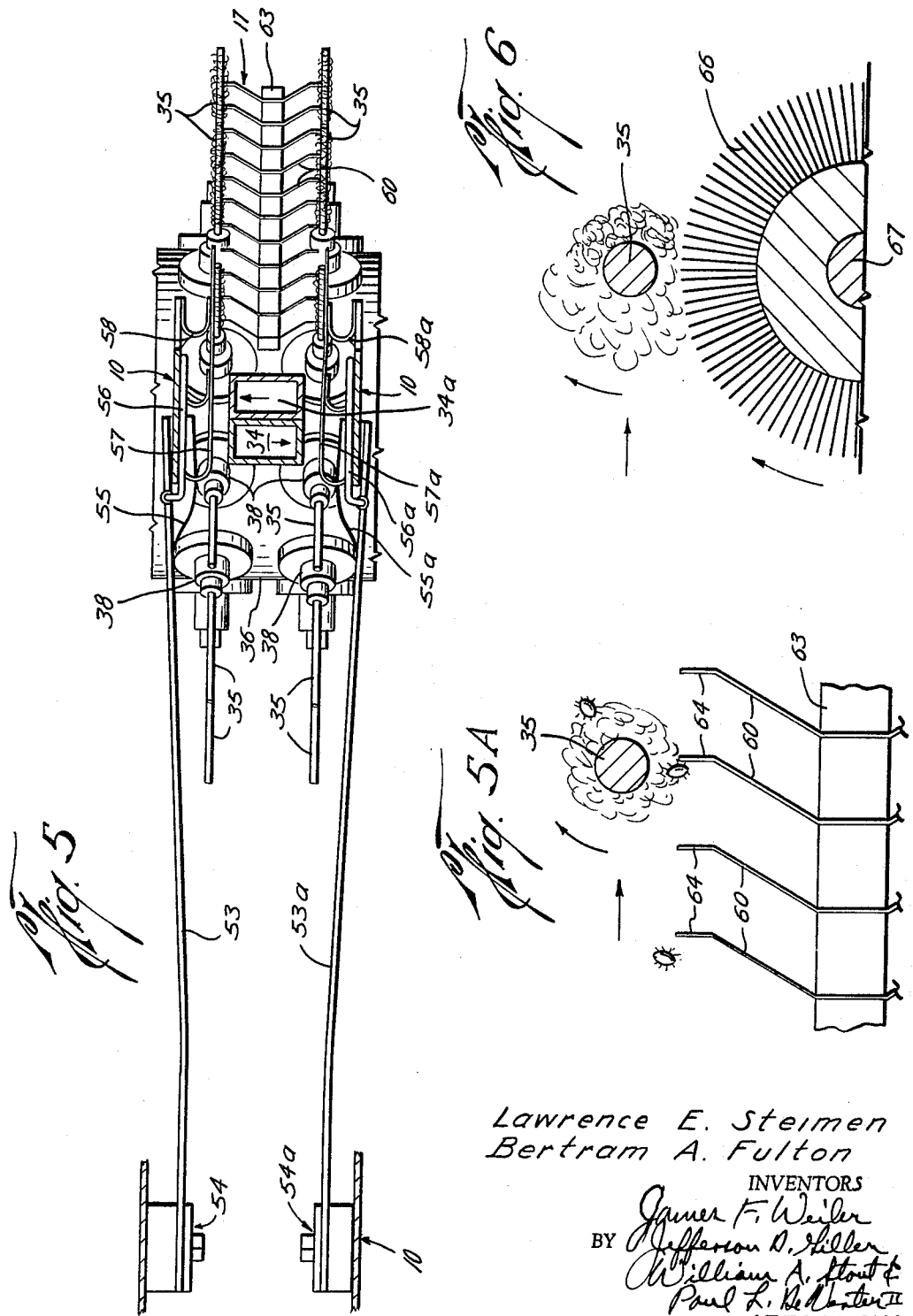

Lawrence E. Steimen
Bertram A. Fulton
INVENTORS

United States Patent Office

3,284,855
Patented Nov. 15, 1966

3,284,855
SEED COTTON CLEANING AND GINNING
Lawrence E. Steimen and Bertram A. Fulton, Cambridge, Mass., assignors, by mesne assignments, to Anderson, Clayton & Co., Houston, Tex., a corporation of Delaware
Filed Jan. 9, 1963, Ser. No. 250,388
14 Claims. (Cl. 19—48)

The present invention relates to new and useful improvements in the cleaning and ginning of seed cotton.

Over the years, seed cotton has become progressively trashier due to the increased use of mechanical pickers and strippers. The so-called saw gin and attendant cleaning machinery presently in wide-spread use for cleaning and removing the cotton fiber or lint from the seed does considerable damage to the cotton fibers. As the industry continues to have more and more mechanical pickers and strippers and to increase the size and speed of the so-called saw gin stands, it is apparent that the overall quality of the cotton fiber will be still further reduced.

It would be highly advantageous to provide new and improved cleaning and ginning of seed cotton in which the fibers and seed are not damaged, in which the lint quality is high and which can be operated on a large scale commercial basis. The present invention is directed to such an improvement.

It is therefore an object of the present invention to provide improved seed cotton cleaning and ginning in which a minimum amount of damage is done to the fibers and to the seed yet which can be operated on a large scale commercial basis.

Yet a further object of the present invention is the provision of seed cotton cleaning and ginning with minimum damage to the fiber and seed and which may be accomplished at relatively low investment and operating cost.

Yet a further object of the present invention is provision of a spindle type gin in which seed is removed from cotton fibers with a minimum of damage to the lint and seed and in which the spindles are substantially self cleaning thereby eliminating serious jamming resulting in costly down time.

Yet a further object of the present invention is the provision of such a spindle gin for removing seed from cotton fibers which is operable at relatively low costs and which has a minimum of maintenance.

A further object of the present invention is the provision of seed cotton cleaning and ginning in which the amount and complexity of the supporting cleaning equipment presently provided both before and after the seed cotton is ginned is reduced.

Yet a further object of the present invention is the provision of seed cotton cleaning and ginning in which the percentage of long fibers is increased, waste is reduced, the yarn skein strength is increased, the yarn appearance grade is improved and the neps are decreased over present commercial ginning of seed cotton.

Figure 2:
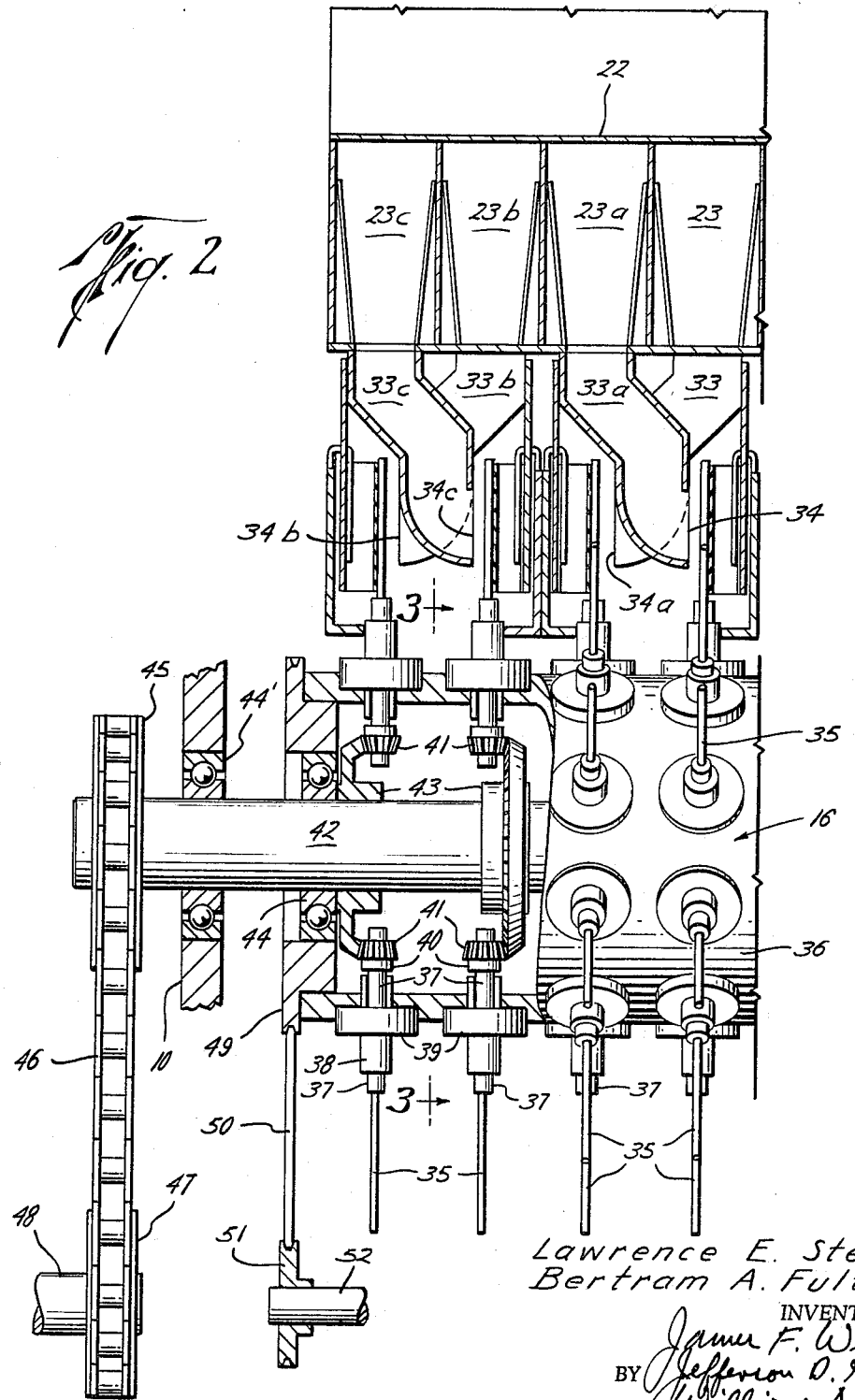
Figure 3:
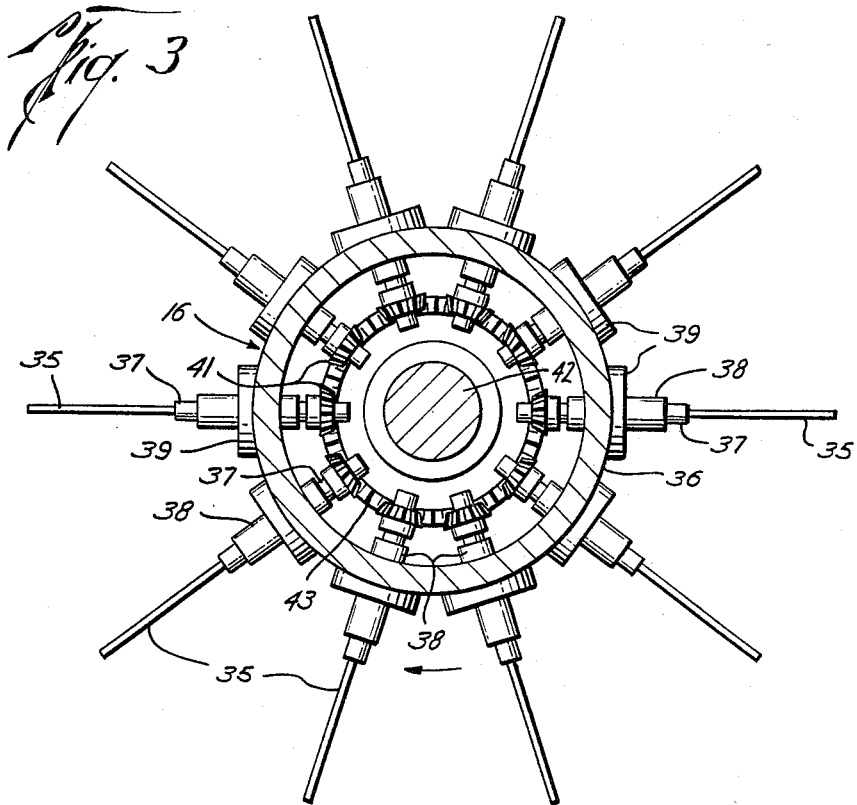
Figure 4:
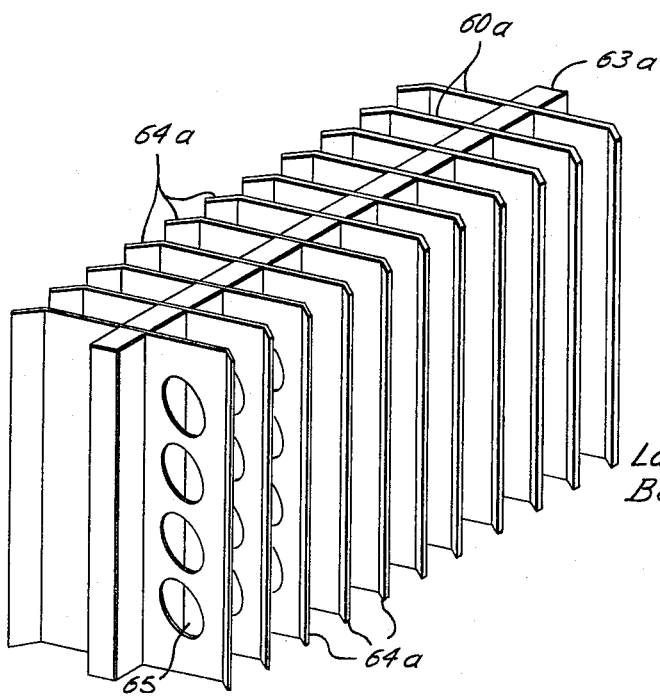
Figure 7:
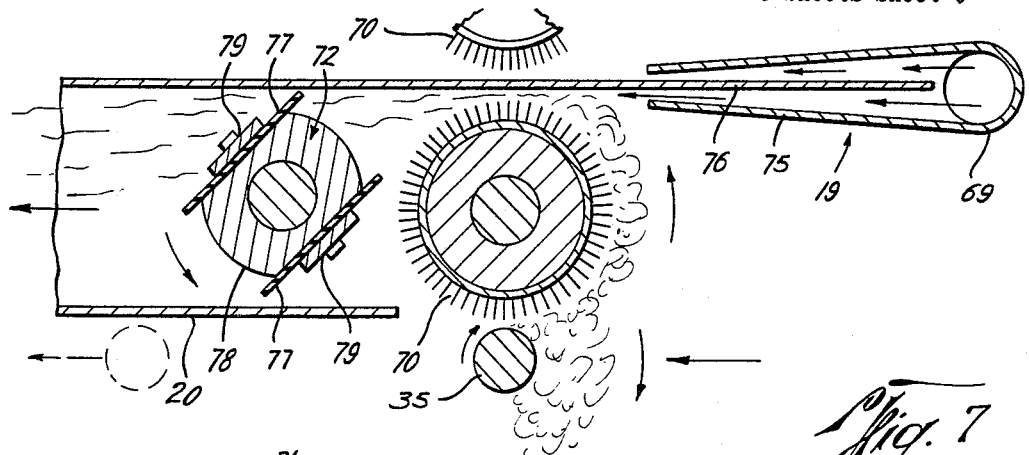
Figure 8:
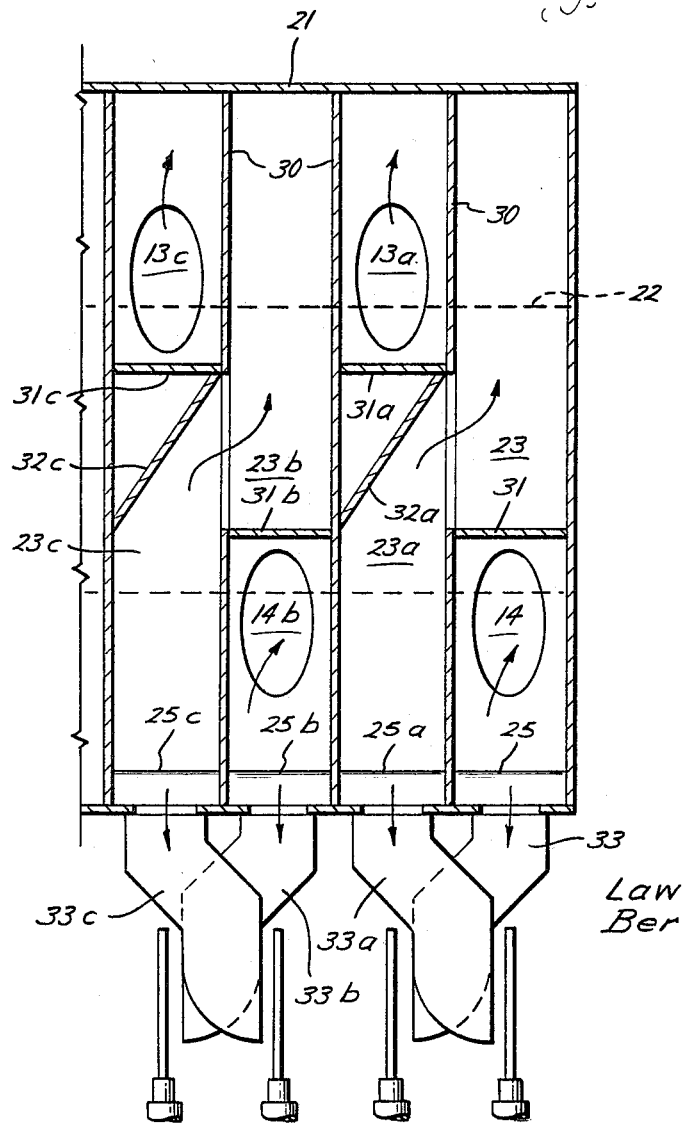

Other and further objects, features and advantages will be apparent from the following description of presently-preferred methods and apparatus of the invention, given for the purpose of disclosure, and taken in conjunction with the accompanying drawing illustrating such apparatus, in which like references designated like parts throughout the several views, and where FIGURE 1 is an elevational view, in section, illustrating apparatus for cleaning and removing seed from seed cotton according to the invention, FIGURE 2 is a cross-sectional view taken along the line 2—2 of FIGURE 1 illustrating a portion of the feeder assembly and the spindle assembly, FIGURE 3 is a sectional view taken along the line 3—3 of FIGURE 2 illuustrating the spindle assembly, FIGURE 4 is a fragmentary, perspective view illustrating a gin or seed bar assembly which the seeds strike and become loosened from the fibers of the seed cotton, FIGURE 5 is a sectional view taken along the line 5—5 of FIGURE 1 illustrating the feeder, spindle and gin assemblies and illustrating modified seed bars or abutments, FIGURE 5A is an enlarged, fragmentary view illustrating the seed removal at the gin assembly, FIGURE 6 is a sectional view taken along the line 6—6 of FIGURE 1 illustrating the lint or fiber loosener, FIGURE 7 is a sectional view taken along the line 7—7 of FIGURE 1 illustrating the doffer assembly, and FIGURE 8 is a sectional view taken along the line 8—8 of FIGURE 1 illustrating the feeder assembly.

Before referring to the drawings, it is noted that the present invention is based upon the surprising discovery that by striking seeds of seed cotton against a flexible member the seeds are loosened from the fibers with practically no damage to the seeds and to the fibers. Preferably, the seed cotton is wrapped about a rod or spindle, the rod or spindle being of a circumference such that the fibers wrap about it and, preferably, in an overlapping condition. The spindle or rod with the seed cotton wrapped about it is then rotated which causes the seeds in the cotton to move outwardly or to be forced outwardly by centrifugal force. The spindles are then brought into engagement with a yieldable lip or plate portion positioned to prevent the cotton seed from passing between the yieldable lip or plate portion and the spindle without deflection. The seed, which is being forced outwardly by centrifugal force, is "spanked" until it is loosened. Continued spanking is provided until the seed is completely free of the fibers. The seed may be loosened from the fibers by a single flexible or yieldable lip or plate or by a plurality of flexible lips or plates, preferably of increasing stiffness. The combined spanking action and centrifugal force readily frees the seed from the fibers. After the seed has been spanked from the fibers, the fibers are doffed from the spindle. As previously mentioned, there is substantially no damage to the seed and the fibers are of high strength, have excellent appearance, are of maximum length with a minimum amount of short lengths, have a relatively low amount of neps and a very low amount of waste.

Referring now to an apparatus of the invention and particularly to FIGURE 1 of the drawings, the spindle gin and cleaner includes a supporting body or frame work, generally indicated by the reference numeral 10, which includes a cloud chamber 11, forming a portion of a feed assembly 12, into which seed cotton is introduced by the conduit 13, with a return line 14, a feed means or seed cotton pickup station 15, a spindle assembly 16 for picking up the seed cotton from the pickup station 15, a gin station 17 for removing seed from the cotton fibers, a cotton loosening station 18 for loosening the fibers on the spindles after the seed has been removed therefrom, and a doffing station 19 for removing the cotton from the spindles, the doffed cotton being removed from the gin and cleaner by means of the conduit 20.

As previously mentioned, and with reference to FIGURE 1, the feed system includes the inlet conduit 13 for the seed cotton leading into the generally circular cloud chamber 11 and the return line 14 leading from the cloud chamber. The cloud chamber 11 has the outer cylindrical wall 21 and an inner cylindrical wall 22 defining an annular chamber 23 in which the seed cotton is swirled. Suitable traps are provided by means of the members 24 and 25, each provided with an opening 26 and 27, respectively, into which loosened trash is swirled by centrifugal force. The openings 26 and 27 are of a size which will permit the entrance of the trash. The traps are connected to the outlets 28 and 29 for removal of trash from the system.

In actual practice it is desirable to provide a plurality of spindles on a spindle assembly to which seed cotton is fed by a plurality of feeders, from which the seed is removed by a plurality of gin stands and the cotton fibers are removed from the spindles by a plurality of loosener and doffer assemblies. To this end, a plurality of feed means may be provided and, with reference to FIGURE 8, it is noted that the annular compartment 23 is divided into a plurality of annular compartments by the partition members 30 to form the annular chambers or compartments 23, 23a, 23b and 23c. It is noted that there is flow from chamber 23a to chamber 23 and from chamber 23c to chamber 23b. This is accomplished by the baffle 31 extending across the chamber 23 downstream from the inlet 13a and upstream from the outlet 14, the baffles 31 and 32a extending across the chamber 23a and downstream from the inlet 13, the baffle 31b extending across the chamber 23b and upstream from the outlet 14b, and the baffles 31c and 32c extending across the compartment 23c downstream from the inlet 13.

Thus, seed cotton is injected into the compartments 23a and 23c through the inlets 13a and 13c, respectively. During the first revolution seed cotton strikes the baffles 25c and 25a causing seed cotton to pass into the feeding tubes 33c and 33a, respectively. The seed cotton not so passing into these tubes passes into the adjacent annular chambers 23 and 23b and strike the baffles or abutments 25 and 25b, respectively, so that seed cotton is provided into the feed tubes 33 and 33b, respectively. Any remaining seed cotton is passed with the air out the return tubes 14b and 14, respectively.

The above arrangement advantageously provides sufficient seed cotton to the spindles without overloading and with a cleaning action to the seed cotton. Any seed cotton returned in the return lines 14b and 14, is of course, returned to the cloud chamber 11 which forms a portion of the entire feeder assembly 12. As many such feeder arrangements may be utilized to provide seed cotton to as many spindles as may be desired.

Referring now to FIGURE 2, the details of the spindle assembly 16 and the picking up of the seed cotton by the spindles is illustrated. The feeding tubes 33, 33a, 33b and 33c have the openings 34, 34a, 34b and 34c, respectively, each adjacent pair opening in opposite directions, as illustrated, and arranged so that the spindles 35 pick up the seed cotton as they pass the opening.

Referring now to the details of the spindle assembly 16, and still with reference to FIGURE 2, it is noted that the spindles extend circumferentially about and rotatably project through a generally cylindrical member 36 in axially-spaced relationship. Thus, there are circumferentially and radially extending sets of spindles, which are axially-spaced from one another in appropriate distance, so that one set of spindles picks up seed cotton from the cotton feeder and moves it from station to station.

The spindles 35 are rotatably journaled through the cylinder wall 36 by means of the enlarged bearing members rotatably extending through the bearings 38 secured to the cylinder wall 36 by means of the nuts 39.

On the inner end of each bearing member 37 there is secured, such as by threading or other means, a nut-like member 40 on which is provided the bevel gears 41.

Rotatably disposed co-axially in the cylinder 16 is the axle or shaft 42 to which are secured a plurality of axially-spaced ring gears 43, by any suitable means, which mesh with the bevel gears 41 at the inner end of each one of the spindles 35 in each circumferentially-extending set. Thus, rotation of the axle 42 in turn causes rotation of the ring gears 43 which, in turn, rotates each individual spindle 35 in its circumferential set.

The axle 42 may be rotatably disposed within the cylinder 36 by any desired means, such as by the anti-friction bearing assemblies generally indicated by the reference numerals 44 and 44'.

The axle 42 is rotated at the desired r.p.m. by means of the sprocket 45 secured to the end of the shaft or axle 42, the chain drive 46 and the sprocket 47 secured to the driven shaft 48 by a suitable prime mover, not shown.

In order to move the individually-rotated spindles 35 throughout a complete cycle and to the various stations, a pulley wheel 49 is secured to an end of the cylinder 36 which is rotated by means of the belt 50 from the pulley 51 secured to the shaft 52 driven by a suitable prime mover, not shown.

While any desired cylinder and spindle speeds may be utilized, it has been found that a cylinder speed of about 30 r.p.m. and a spindle speed of about 2600 r.p.m. are satisfactory.

The circumferential arrangement of the spindles 35 and one set thereof being driven by the ring gears 43 is best illustrated in FIGURE 3, to which reference is made. Each set of circumferential-extending spindles is similarly driven so that the spindles 35 rotate in the same direction completely throughout their cycle of travel and there is no necessity for reversing the rotation of these spindles.

Perferably some means are provided to open and close the cotton seed feed openings or ports, such as indicated at 34 and 34a in FIGURE 5, to which reference is now made, so that when the spindles 35 are not picking up cotton from them the seed cotton is contained. For this purpose, the leaf springs 53 and 53a are provided, which are secured to the body frame member 10 in any suitable manner such as by the bolts and washers, all generally indicated by the reference numeral 54 and 54a, which springs include the camming surfaces 55 and 55a which engage the enlarged bearing surfaces 38 on the spindles 35 as they approach and are adjacent the feed port openings 34 and 34a. Secured adjacent the ends of the springs 53 and 53a are the generally L-shaped, plate-like members 56 and 56a, respectively, which when the springs 53 and 53a are cammed out as shown, stop against the body member 10.

Secured to the inner-facing portion of each L-shaped member 56 and 56a, is a flexible strip like member 57 and 57a, respectively, which are held in a spaced relationship with the L-shaped member 56 and 56a by the spacers 58 and 58a, respectively.

In the position of the parts shown in FIGURE 5, two flexible strips, which may be rubber or other suitable material, are shown in a cammed-out position as the spindles 35 are picking up seed cotton from the port openings 34 and 34a. Once the spindles have passed the camming surface 55, this will permit the springs 53 and 53a to move inwardly toward one another, these springs being biased in an inward direction, which then brings the flexible strips 57 and 57a against and close the port openings 34 and 34a, respectively. In this manner, there is an automatic opening and closing of these feed ports so that seed cotton is wrapped about the rotating spindles 35 as they pass them, and the ports are automatically closed as the spindles 35 leave these ports and are opened by the camming arrangement mentioned upon approach of the next spindle.

Referring now to FIGURE 1, the gin assembly or gin station 17 includes a supporting base plate 59 by which it is secured to the body 10, to which base plate are secured a plurality of flexible seed bars or members 60 which includes a seed collector conduit 61 and discharge conduit 62 by which seeds spanked free of the cotton fibers are removed.

The details of construction, mounting and the like of the seed bar 60 are better illustrated in FIGURES 5 and 5A to which reference is now made. It is noted that the seed bars extend outwardly, and preferably outwardly from each side of the central stationary body member 63, which while not shown, is secured to the structural member 59 (FIGURE 1).

It is noted that the seed bars or abutments 60, generally extend in a transverse direction with respect to the axis of the spindles 35. The outer edge portions 64 may be at right angles generally to the path of travel of the spindles 35 or, as shown in FIGURE 4 illustrating a modification, the ends 64a may be turned generally in another direction, such as away from path of movement of the spindles 35.

As previously mentioned, the seed members or abutments 60, or the edge portions 64 and 64a preferably are progressively stiffer or less flexible or yielding. This is presently accomplished by means of having these members of increasing greater transverse dimension, as shown, or by providing the openings 65 in certain of the seed bars or abutments 60a (FIGURE 4). In this manner all of the seed bars or abutments 60 and 60a may be fabricated of the same material, for example, spring steel, although these bars and members may be made of different materials and different materials with respect to one another.

As shown, the seed bars 60 and 60a are held snugly against the base plates 63 and 63a, respectively, (FIGURES 5A and 4) in any desired manner, the details thereof having been eliminated in order to simplify the disclosure.

It is noted that the outer ends 64 and 64a of the seed bars or abutments 60 and 60a, respectively, are disposed closely adjacent to the path of travel of its cooperating spindles 35 and such that seeds in the seed cotton cannot pass between these ends and the outer surface of the spindles 35.

As described in more detail later, in combination with the centrifugal action, this effectively loosens and removes the seed from the seed cotton with a minimum of damage to the fibers.

Referring again to FIGURE 1, the fiber loosening assembly 18 comprises a generally cylindrical-shaped brush 66 which is disposed on the shaft 67 driven by the motor 68 secured to the body member 10.

As best seen in FIGURE 6, to which reference is now made, the brush 66 is rotated in a direction and at a speed tending to unwrap and, hence, loosen the cotton fibers on the spindle 35 so that it tends to loosen the fibers on these spindles 35 so that the fibers may be readily doffed from the fibers at the doffing station 19.

Turning again to FIGURE 1, the doffer assembly 19 includes the blower 69, the generally cylindrical card 70 rotated by the flexible shaft 71 and the doffer 72 rotated by the flexible shaft 73 by electric motors, not shown, the shafts 71 and 73 extending through the bearings 74. Associated with the blower 69, doffing card 70 and doffer 72 is a conduit 20 by which cotton doffed from the spindles 35 by the doffing assembly 19 are removed so that the spindles 35 may then again pick up seed cotton as previously described.

The details of these various doffing elements are best illustrated in FIGURE 7, to which reference is made.

A directional air outlet or nozzle 75 is provided adjacent the blower 69 and a partition 76 in the conduit 20 by which cotton fiber is removed from the system extends into the air nozzle 75 as illustrated. This directs a stream of air along both sides of the partition 76 in the conduit 20 so that a single blower may serve a pair of doffing arrangements for removing cotton lint from two sets of spindles.

The doffing card or brush 70 is rotated in a direction so that as the extending members of the card or brush 70 engage the cotton fibers on the spindle 35 they do so in a direction tending to upwrap these loosened fibers from the spindle 35. This causes the fibers to rotate toward the partition 76 and into the steram of air directed along its length from the blower 69 out the air nozzle 75.

The doffer 72 includes a pair of flexible strip-like members 77 secured to a generally cylindrical member 78, such as by the nuts and washers, generally indicated by the reference numeral 79, although it may be so secured in other ways. The rotation of the doffer 72 is in a direction and the flexible strip 75 are so spaced as to doff the cotton fibers from the projections of the doffing brush or card 70 in the usual manner. The stream of air from the blower 69 and the air nozzle 75 then blows the fibers into the conduit 20 where they are removed from the apparatus and collected by any suitable means, not shown.

In operation, and with reference to FIGURE 1, seed cotton enters the annular cloud chamber 23 by means of the inlet 13 where it is whirled around by centrifugal action, trash is collected in the traps 24 and 27 and removed in the lines 28 and 29. The seed cotton is directed into the various feed compartments 23, 23a, 23b and 23c and into the feed outlet tubes 33, 33a, 33b and 33c and are picked up by the spindles 35 as previously described. The engagement of the seed cotton by the rotating spindles 35 as they pass the feed station causes the seed cotton to wrap about them. Preferably, the spindles 35 are of such a circumference that the seed cotton will wrap completely about them and overlap a short distance so that the seed cotton will not inadvertently come off the spindle 35.

As previously mentioned, the spindles 35 pass by the yieldable lips or edge portions 64 of the seed bar members or abutments 60 a distance such that the seed cannot pass between them and the spindles without engaging and deflecting them and thereby spanking the seed. The centrifugal action of the spindle causes the seeds to be forced to the outer portion of the fibers or tend to move in this direction, as best seen in FIGURE 5A, and the continued spanking causes the seeds to become loosened and removed from the fibers. The progressively stiffer and increased spanking action of these seed bar or abutments 60 combined with the centrifugal action causing the seeds to be forced outwardly from the fibers on the spindles effectively loosens and removes the seed from the cotton fibers, the loosened seeds being collected in the seed collector 61 (FIGURE 1) and removed by means of the seed discharge conduit 62.

As the spindles 35 progress in their travel, the deseeded cotton fibers on them now engage and are brushed by means of the loosening brush 66 in a direction tending to loosen or unwind the fibers on the spindles 35 to condition the fibers to be doffed from the spindles 35 at the doffing station 19.

The spindles 35 then progress from the loosening station 18 with the loosened cotton fibers on them to the doffer station 19 where the cotton is doffed by means of the cylindrical doffing card 70, flexible doffer 72, and means of the air jet from the air blower 69 coming from the air discharge nozzle 75.

The spindles 35 then pass again to the feeding station 12 and the cycle is repeated.

It is apparent that the foregoing described cycle for each spindle is accomplished sequentially as the spindles rotate about the various stations.

In actual practice, a plurality of annular cloud members 23, cooperating feeding stations 12, axially-spaced sets of spindles 35, gin stations 17, fiber loosening stations 18 and doffing stations 19 are provided, as indicated. The spindles 35 as previously mentioned, are all mounted on a suitable drum member and, advantageously, various of the parts serve a pair of circumferentially-extending set of spindles as previously described by working centrally or between the pair.

The seed cotton is advantageously cleaned at various times during the cycle. Thus, in the cloud chambers 21 of the feed means 11, during the pickup of the seed cotton by the spindles 35 at the feeder, during the ginning at the gin station 17, the seed cotton is subjected to a cleaning action. Similarly, at the loosening station 18 and the doffing station 19 the de-seeded cotton fibers are subjected to a cleaning action.

If desired, the loosening station 18 may be omitted; however, in practice this is quite advantageous in that it assures substantially complete doffing of the spindles 35 at the doffing station 19.

As previously mentioned, various structural details of supporting members, prime movers, drive means and the like have been eliminated to simplify the disclosure. These means, however, may be as desired, are conventional, and accordingly no detailed description thereof is deemed necessary or given.

The foregoing apparatus of the invention may be used in the method thereof. The method includes subjecting seed cotton to a centrifugal action so that the seeds in the cotton fibers are forced in an outwardly direction due to centrifugal action. The seed cotton is then struck against a flexible or yieldable member, and preferably against a flexible or yieldable lip or edge portion of an immovable member. This loosens the seed from the fibers of the seed cotton without appreciable damage to the fibers or to the seeds. Preferably, the seed cotton is wrapped about a spindle, and the spindle with the cotton about it is rotated in the direction of wrapping closely adjacent a yieldable or flexible lip or edge portion of a stationary member so that the seed will not pass between the spindle and the lip or edge. Thus, the seed strikes the lip or edge, which serves as a stationary abutment, so that the seed is loosened from the fibers and the flexing or yielding of the lip or edge does not tear the seed from the fibers in a manner to damage the seed or tear the fibers as would happen if the stationary abutment was rigid or the lip or edge portion thereof was rigid or stationary.

The striking of the seed against the flexible or yieldable portion of the abutment is continued until the seed is "spanked" loose and free of the fibers. This is accomplished by repeatedly striking the same flexible stationary abutment or by bringing the spindle with the seed cotton wrapped about it into successive seed striking relationship with a plurality of stationary abutments having flexible or yielding striking edge or lip portions while subject to centrifugal action. Preferably, the striking edge or lip portions of the abutments are generally progressively less yielding or flexible so that the most easily removed seeds are first removed and the other seeds are loosened somewhat before striking the less yielding striking portions. In this manner, the seeds are loosened without appreciable damage to the seed or to the lint or fiber quality.

The de-seeded cotton fibers are then doffed from the spindle in any desired way and the process is repeated.

In the event stationary or unyielding striking portions of the seed bars or abutments are used in the manner of the prior art, and particularly initially, considerable damage is done to the seed and to the fibers. Preferably, the striking portions of the seed bars or abutments 68 should be as flexible or yieldable as possible and yet remove or spank the seed from the cotton fibers.

The following table compares seed cotton lots ginned by commercial saw gin stands and by the apparatus and method of the present invention.

TABLE I

| Identification | Length Array (Short Mehtod) | | |
| --- | --- | --- | --- |
| | Upper 25% Point (inches) | 75/25 Ratio (percent) | Fibers less than ½″ (percent) |
| Double Lint Cleaners | | | |
| Commercially Ginned: | | | |
| Array #1 | 1.05 | 63.3 | 14.9 |
| Array #2 | 1.05 | 62.6 | 14.9 |
| Array #3 | 1.05 | 63.6 | 14.2 |
| Mean | 1.050 | 63.17 | 14.67 |
| This invention | | | |
| Spindle Ginned: | | | |
| Array #1 | 1.11 | 73.6 | 8.2 |
| Array #2 | 1.10 | 73.9 | 8.7 |
| Array #3 | 1.11 | 73.8 | 8.0 |
| Mean | 1.107 | 73.43 | 8.30 |
| Hand Ginned Cotton: | | | |
| Array #1 | 1.06 | 75.4 | 7.0 |
| Array #2 | 1.05 | 73.9 | 7.5 |
| Array #3 | 1.06 | 72.9 | 7.8 |
| Mean | 1.057 | 74.07 | 7.43 |

All arrays were from the same farm cart. Spindle ginned refers to ginning by the present apparatus and method. From the above table it is noted that the cotton ginned according to the present invention has longer strands and has less short fibers than the commecially saw ginned array of cotton. The spindle ginned lint was longer and nearly as uniformed as hand ginned lint and was longer, more uniform and had less short fibers than commercially ginned lint.

The present invention, therefore, is well suited and adapted to attain the objects and ends and has the advantages and features mentioned as well as other inherent therein.

While preferred apparatus and methods have been given for the purpose of disclosure, changes in detail, arrangement and steps may be made therein which are within the spirit of the invention as defined by the scope of the appended claims.

What is claimed is:

1. A method of removing seed from seed cotton comprising,
   (a) wrapping the seed cotton about a spindle,
   (b) rotating the spindle with the seed cotton wrapped on it closely adjacent a stationary member having a flexible lip portion so that the seed is forced outwardly by centrifugal force and strikes the flexible lip portion thereby loosening the seed from the fibers of the seed cotton, and
   (c) doffing the fibers substantially free of the seed from the spindle.

2. A method of removing seed from seed cotton comprising,
   (a) wrapping the seed cotton about a spindle,
   (b) rotating and moving the spindle with the seed cotton wrapped about it in close proximity to a plurality of stationary gin members provided with flexible lip portions so that the seed is forced outwardly by centrifugal force and strikes the flexible lip portions and loosens the seed from the fibers of the seed cotton, and
   (c) doffing the fibers substantially free of the seed from the spindles.

3. A method of removing seed from seed cotton comprising, (a) wrapping the seed cotton about a spindle,
(b) rotating and moving the spindle with the seed cotton wrapped about it closely adjacent to a plurality of stationary gin members provided with flexible lip portions of generally increased stiffness so that the seed is forced outwardly by centrifugal force and strikes the lip portions which loosens it from the fibers of the seed cotton, and
(c) doffing the fibers from the spindle.

4. Apparatus for removing seed from seed cotton comprising,
(a) an elongate spindle arranged to rotate about its axis,
(b) means for feeding seed cotton to the spindle,
(c) at least one gin member provided with a flexible edge portion arranged so that as the seed cotton is rotated on the spindle, the seeds therein are forced outwardly by centrifugal action and strike the flexible edge portion thereby separating the seed from the fibers of the seed cotton,
(d) a doffer for doffing the fibers from the spindle, and
(e) means for moving the spindle from the gin member to the doffer.

5. Apparatus for removing seed from seed cotton comprising,
at least one elongate spindle arranged to rotate about its axis,
means to rotate the spindle about its axis,
means for feeding the seed cotton to the rotating spindle whereby the seed cotton wraps about the spindle,
at least one gin member provided with a flexible lip portion, and
means for moving the rotating spindle into close proximity with the flexible lip portion of the gin member so that seeds in the seed cotton wrapped about the spindle strike the flexible lip portion while subjected to centrifugal action and are separated thereby.

6. Apparatus for removing seed from seed cotton comprising,
(a) at least one elongate spindle arranged to rotate about is axis,
(b) means for feeding the seed cotton to the rotating spindle whereby the seed cotton wraps about the spindle,
(c) at least one gin member provided with a flexible edge portion,
(d) means for moving the rotating spindle into close proximity with the flexible edge portion of the gin member so that seeds in the seed cotton wrapped about the spindle strike the flexible edge portion while subjected to centrifugal action and are separated thereby, and
(e) means for doffing the fibers of the seed cotton from the spindle.

7. Apparatus for removing seed from seed cotton comprising,
(a) a body,
(b) a member rotatably mounted on the body,
(c) a plurality of spindles rotatable about their axes carried by the member,
(d) means for feeding the seeding cotton to the spindles during a portion of their travel, and
(e) a plurality of gin members provided with flexible edge portions and arranged so that the spindles with the seed cotton wrapped thereon pass the gin members in close proximity to the flexible edge portions so that the seed while subjected to centrifugal action strike the flexible edge portions and become separated from the fibers of the seed cotton.

8. Apparatus for removing seed from seed cotton comprising,
(a) a body,
(b) a member rotatably mounted on the body,
(c) a plurality of spindles rotatable about their axes carried by the member,
(d) means for feeding seed cotton to the spindles during a portion of their travel for wrapping the seed cotton about the spindles, and
(e) a plurality of stationary seed abutments provided with yieldable lip portions of generally progressively greater stiffness and arranged so that the spindles with the cotton wrapped about them pass the lip portions in close proximity thereto so that the seeds strike the progressively stiffer flexible lip portions while subjected to centrifugal action and become loosened from the seed cotton.

9. Apparatus for removing seed from seed cotton comprising,
(a) a body,
(b) a cylindrical drum rotatably mounted on the body,
(c) a plurality of spindles rotatable about their axes circumferentially disposed on the drum,
(d) means for feeding seed cotton to the spindles during a portion of their travel for wrapping the seed cotton about the spindles,
(e) a plurality of stationary seed abutments provided with flexible lip portions of generally progressive stiffness and arranged so that the spindles with the cotton wrapped about them pass the lip portions in close proximity thereto so that the seeds strike the progressively stiffer flexible lip portions while subject to centrifugal force and become loosened from the seed cotton,
(f) a fiber loosener on the body arranged to engage the fibers on the spindle after the spindles travel past the seed abutments for loosening the fibers, and
(g) doffing means on the body arranged to engage the fibers on the spindles and to doff them from the spindles after the fibers are loosened by the fiber loosener.

10. Apparatus for removing seed from seed cotton comprising,
(a) a body,
(b) a cylindrical drum rotatably mounted on the body,
(c) a plurality of spindles rotatable about their axes circumferentially disposed on the drum,
(d) feed means for feeding the seed cotton to the spindles during a portion of their travel for wrapping the seed cotton about them,
  (1) said feed means including means for swirling said seed cotton and including one or more traps arranged to permit entry of dirt from the seed cotton, and
(e) a plurality of gin members provided with yieldable edge portions and arranged so that the spindles with the seed cotton wrapped thereon pass the gin members in close proximity to the yieldable edge portions so that the seeds strike the yieldable edge portions while subject to centrifugal force and become loosened from the fibers of the seed cotton.

11. Apparatus for removing seed from seed cotton comprising,
(a) a body,
(b) a member movably mounted on the body,
(c) a plurality of spindles rotatable about their axes carried by the member,
(d) means for feeding seed cotton to the spindles during a portion of their travel for wrapping the seed cotton about the spindles,
(e) at least one gin member provided with a flexible lip portion arranged so that the spindles with the cotton wrapped about them pass the lip portion in close proximity thereto so that the seeds strike the lip portion while subject to centrifugal force and become loosened from the seed cotton, and
(f) doffing means on the body arranged to engage the fibers on and to doff them from the spindles after the spindles pass the gin member during their travel.

12. Apparatus for removing seed from seed cotton comprising,
(a) a body,
(b) a member rotatably mounted on the body,
(c) a plurality of spindles rotatable about their axes carried by the member,
(d) means for feeding the seed cotton to the spindles during a portion of their travel, said means including
 (1) a feeder tube having a discharge opening, and
 (2) means closing the opening operable as said spindle passes the opening, and
(e) a plurality of gin members provided with flexible edge portions and arranged so that the spindles with the seed cotton wrapped thereon pass the gin members in close proximity to the flexible edge portions so that the seeds strike the flexible edge portions while subject to centrifugal action and become loosened from the fibers of the seed cotton.

13. Apparatus for removing seed from seed cotton coming,
(a) a body,
(b) a member rotatably mounted on the body,
(c) a plurality of spindles rotatable about their axes carried by the member,
(d) means for feeding seed cotton to the spindles during a portion of their travel for wrapping the seed cotton about the spindles, said means including
 (1) a feeder tube having a discharge opening,
 (2) a yieldable element biased toward and arranged to close said opening, and
 (3) a cam means associated with the yieldable element engageable by a portion of the spindles as they approach the discharge opening for moving the yieldable element to open positions, and
(e) a plurality of stationary seed abutments provided with yieldable lip portions and arranged so that the spindles with the cotton wrapped about them pass the lip portions in close proximity thereto so that the seeds strike the lip portions while subject to centrifugal action and become loosened from the seed cotton.

14. Apparatus for removing seed from seed cotton comprising,
an elongate spindle arranged to rotate about its axis,
means for feeding seed cotton to the spindle,
means for rotating the spindle to wind the seed cotton thereabout,
a least one gin member provided with a flexible edge portion arranged so that as the seed cotton is rotated on the spindle, the seeds therein are forced outwardly by the centrifugal action and strike the flexible edge portion thereby separating the seed from the fibers of the seed cotton,
a cylindrical brush-like member rotatable on its axis in a direction tending to unwind the fibers from the spindle, said brush-like member arranged to engage the fibers on the spindle after the spindle travels past the gin member,
means for moving the spindle adjacent the means for feeding seed cotton, the gin member and the brush-like member,
a doffer provided with at least one flexible strip arranged to engage and doff the fibers from the brush-like member, and
pneumatic means arranged to remove the doffed fiber from the doffer.

References Cited by the Examiner
UNITED STATES PATENTS

| | | | |
|---|---|---|---|
| 72,846 | 12/1867 | Gwathmey | 19—57 |
| 512,445 | 1/1894 | Kopfler | 19—58 |
| 1,709,553 | 4/1929 | Benjamin | 19—38 |
| 1,961,432 | 6/1934 | Quigley | 19—35 X |
| 2,462,800 | 2/1949 | Berry | 19—59 X |
| 2,930,177 | 3/1960 | Hubbard | 56—41 |
| 2,975,577 | 3/1961 | Davenport | 56—14 |
| 3,046,611 | 7/1962 | Vandergriff | 19—35 |

MERVIN STEIN, *Primary Examiner.*

RUSSELL C. MADER, DONALD W. PARKER, ROBERT R. MACKEY, *Examiners.*

D. NEWTON, *Assistant Examiner.*